July 26, 1938. H. D. JOHNSON, JR., ET AL 2,124,978
PICKER CONTROL FOR AUTOMATIC LOOMS
Filed Dec. 12, 1936 5 Sheets-Sheet 1
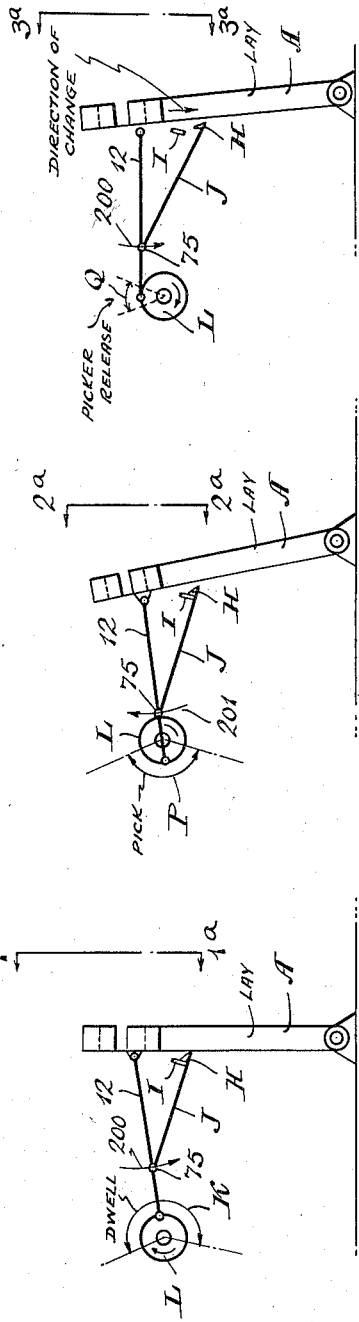
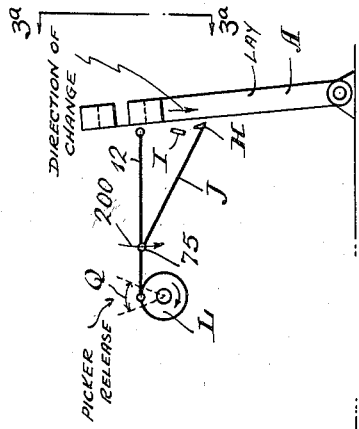
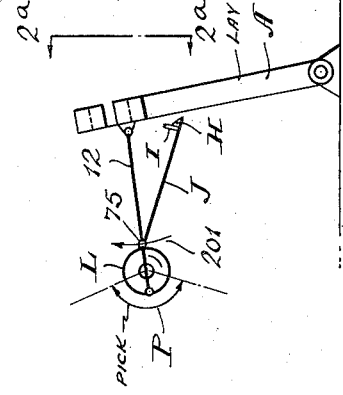
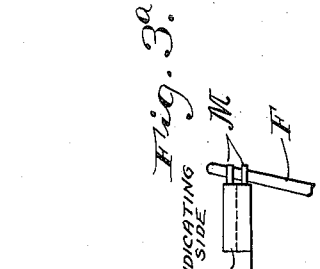
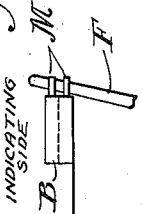
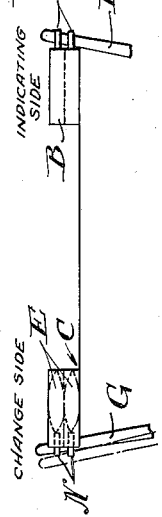
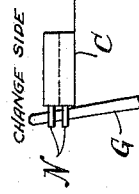
INVENTORS
HENRY DOWNER JOHNSON JR
WOODRUFF T. SULLIVAN
BY
Richards & Geier
ATTORNEYS

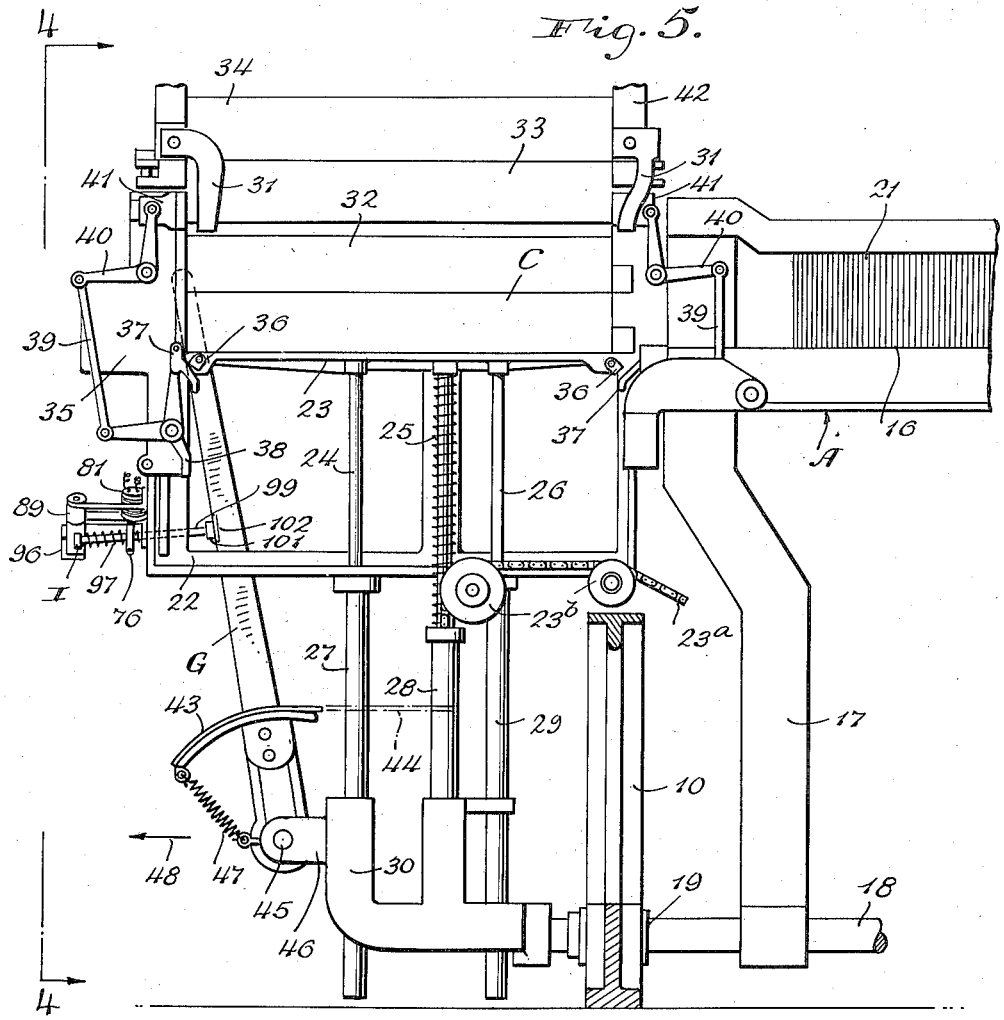

July 26, 1938.  H. D. JOHNSON, JR., ET AL  2,124,978
PICKER CONTROL FOR AUTOMATIC LOOMS
Filed Dec. 12, 1936  5 Sheets-Sheet 4
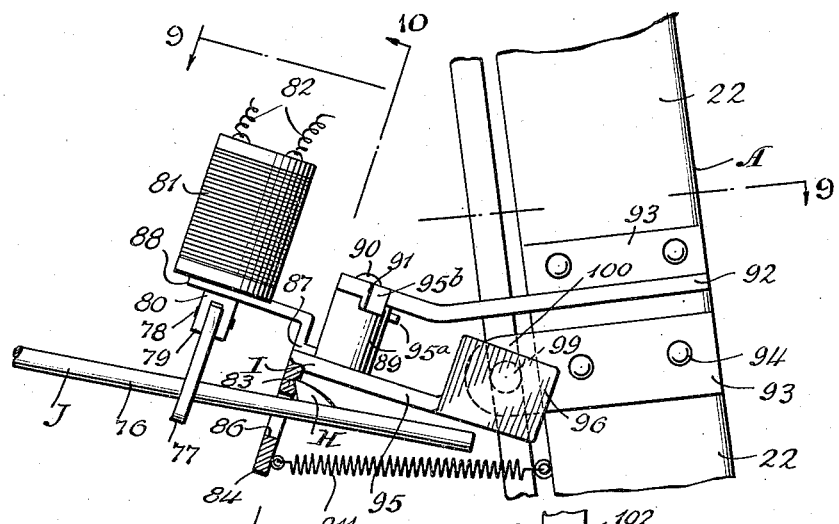
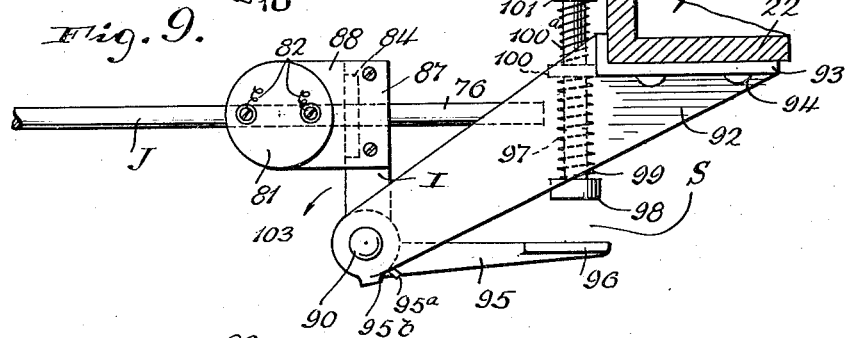
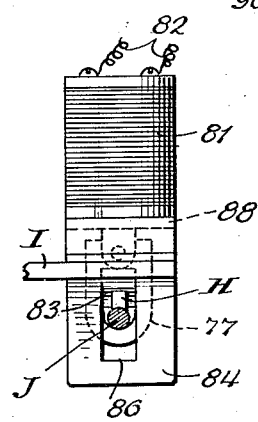
INVENTORS
HENRY D. JOHNSON JR
WOODRUFF T. SULLIVAN
BY
Richards & Geier
ATTORNEYS

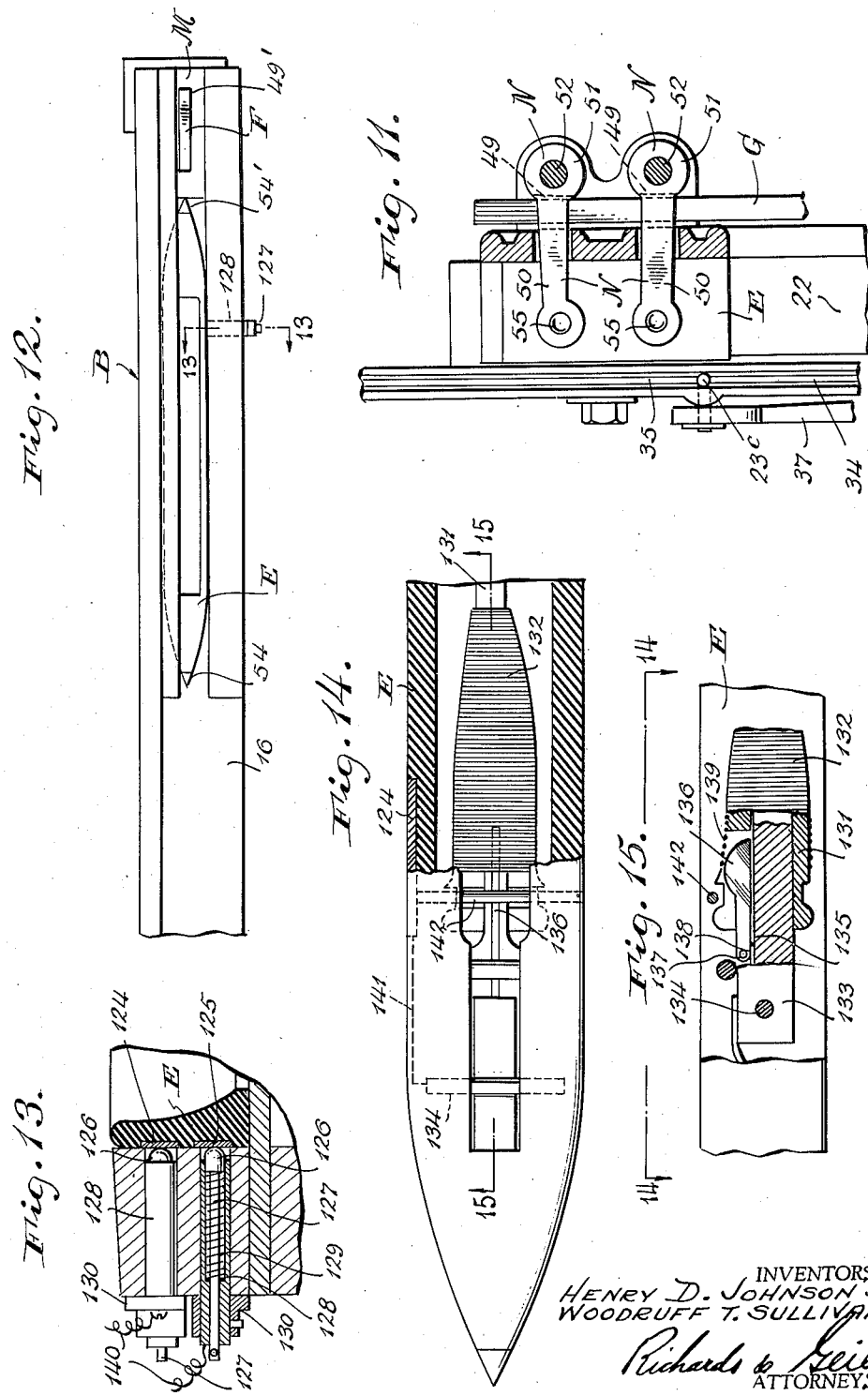

Patented July 26, 1938

2,124,978

UNITED STATES PATENT OFFICE 2,124,978

PICKER CONTROL FOR AUTOMATIC LOOMS

Henry Downer Johnson, Jr., and Woodruff T. Sullivan, Norwich, Conn., assignors to J. B. Martin Company, Norwich, Conn., a corporation of Delaware Application December 12, 1936, Serial No. 115,462

7 Claims. (Cl. 139—225)

The present invention relates to a picker control for automatic looms either of the shuttle or box change type.

Although not restricted thereto, the present invention will be illustratively described in connection with its application to shuttle box unit changing looms of the character shown and described in Patent No. 2,017,065, issued October 15, 1935 to Henry Downer Johnson, Jr., and Woodruff T. Sullivan, which patent discloses a shuttle box unit or carrier changing arrangement for a double shuttle loom. The shuttle box unit changing mechanism shown in Patent No. 2,017,065 may also be operated with a single shuttle loom.

Although not a preferred application, the picker control arrangement of the present invention is also applicable to looms in which the shuttle or box or shuttles or boxes are subject to being shifted during weaving operation to change the colors or character of the filler.

In general, in looms the shuttle or shuttles on entering the box or boxes on either side of the lay structure after traversing the shed, are slowed in their movement by the brakes or swells associated with the box structure and are then finally stopped by the picker or pickers.

When stopped, the spurs of the shuttle or shuttles will be received in depressions or recesses in the pickers.

When the shuttle or shuttles are to be changed either because of exhaustion or because it is desirable to substitute another type of filler, this change most desirably should take place after the shuttles have been stopped by the pickers.

To assure a most satisfactory change of the shuttles, it is necessary that the recesses in the pickers be removed from the spurs of the shuttles, and since only a limited time is available for changing the shuttles, this change should take place as promptly as possible.

It is among the objects of the present invention to provide an improved control mechanism which will be promptly and automatically actuated to release the pickers, when the shuttles are to be changed and which may be readily attached to or associated with looms of standard construction.

Another object is to provide the method of controlling pickers incidental to shuttle-changing or transferring in automatic looms which will assure that the shuttles be released from the pickers shortly before the shuttle changing mechanism is actuated.

Other objects will be obvious or will appear during the course of the following specification.

In accomplishing the above objects, it has been found most desirable that the shuttle changing mechanism and picker release mechanism be substantially actuated at about the same time by the indicating mechanism, which indicates the change of shuttles should take place either because of exhaustion of the filler therein or because of the need for change of filler.

According to one form, the picker upon indication is moved inwardly to stop the shuttles in front of their usual stopping position. As soon as the shuttles have been stopped, the picker is then moved away so as to altogether release the spur or spurs thereof and permit the shuttle or shuttles to be readily changed.

At the same time, the picker will be out of the way so that the new shuttles may conveniently drop into operating position.

According to one embodiment, which has been found to be satisfactory, the picker stick, the upper end of which is received in a slot in the picker or pickers is provided with a plunger and lever control mechanism, which in turn may be actuated by a latch arrangement connected with the crank connector.

The latch arrangement is normally disengaged during the intervals between changes of shuttles. However, when a shuttle change is indicated, the latch is caused to engage the lever control by a solenoid and the lever control operated to move the pickers in and stop the shuttles ahead of their normal stopping position. Then the picker is returned to the original position to permit the shuttle change to take place.

The above and other objects will appear more clearly from the following detailed description when taken in connection with the accompanying drawings and will illustrate the preferred embodiments of the inventive idea.

In the drawings:

Figures 1 to 3a illustrate diagrammatically the operation of the picker control mechanism of the present application; Figures 1, 2 and 3 being side views of the lay and its actuating crank in successive positions during the actuation of the picker and Figures 1a, 2a and 3a being corresponding front views showing the boxes on both sides of the loom.

Figure 5 is a front view of the lay end structure upon the line 5—5 of Figure 4 with the lay end at its foremost position.

Figure 7 is a transverse sectional view through the lay end on an enlarged scale showing the picker positions.

Figure 8 is a fragmentary side view of a portion of the lay end structure similar to that shown in Figure 4, but upon enlarged scale and showing in detail the picker control mechanism.

Figure 9 is a transverse sectional view on the line 9—9 of Figure 8.

Figure 10 is an oblique sectional view on the line 10—10 of Figure 8.

Figure 11 is a fragmentary sectional view on the line 11—11 of Figure 7, showing the inside face of the pickers.

Figure 12 is a top view of the indicating box at the side of the loom opposite that from which the change takes place.

Figure 13 is a transverse sectional view upon enlarged scale upon the line 13—13 of Figure 12.

Figures 14 and 15 are respectively fragmentary top and side sectional views upon the lines 14—14 of Figure 15 and 15—15 of Figure 14, respectively illustrating the manner in which indication is made when the filler is exhausted.

In Figures 1 to 3a, inclusive, is diagrammatically shown one method of controlling a picker according to the present invention incidental to a change of shuttles, so that the shuttles may be stopped and the pickers may be withdrawn therefrom before the change of shuttles, with the assurance that the changing operation will not be delayed or prevented from taking place due to the spurs of the shuttle remaining engaged with the pickers.

In Figures 1 to 3a, is shown diagrammatically the operation of the picker control of the present invention as applied to a double shuttle loom for weaving velvets in which the change is caused to take place when the filler is exhausted in one or both of the shuttles.

However, it is understood that the invention is applicable to single shuttle changing looms and other multiple shuttle looms where the shuttle or shuttles are to be changed either to insert a different type of filling or because of exhaustion.

Referring to Figures 1 to 3a, inclusive, the lay A carries the indicating shuttle box B and the change shuttle box C. The shuttles E are thrown transversely between the indicating box B and the change box C by pickers M and N actuated by the picker sticks F and G.

In Figures 1 and 1a, the lay A is in its front position and the shuttles are in the indicating box B where an indication has been given that the filler in one or both shuttles has been exhausted.

This indication will energize the solenoid or other control device, elevating the latch H carried by the latch arm to cooperate with the lever I.

During the arc K, as indicated at Figure 1, the shuttles E will remain or dwell in the indicating box B.

Then, as the lay crank moves away from the lay front position of Figure 1, the latch H will engage the lever I. The lever I will in turn cause movement of the picker stick G and the pickers N will be moved inside of the normal position of Figure 1a. They will then be withdrawn and as they are being withdrawn, they will meet and stop the shuttles at the end of the pick indicated by the arc P in Figure 2.

The movement of the pickers N will continue until these pickers have substantially removed themselves from the ends of the shuttles E, as indicated in Figure 3a, and finally, as indicated in Figure 3, the latch H will drop out of engagement with the lever I.

The shuttles B then may be pushed, dropped or elevated out of position according to the type of change, which it is desired to accomplish.

In Figures 4 to 7, is shown the application of the picker control of the present invention to the release of the shuttles in a replaceable double shuttle box of the type shown in Johnson and Sullivan Patent No. 2,017,065 to which, however the invention is by no means restricted.

Figure 4:
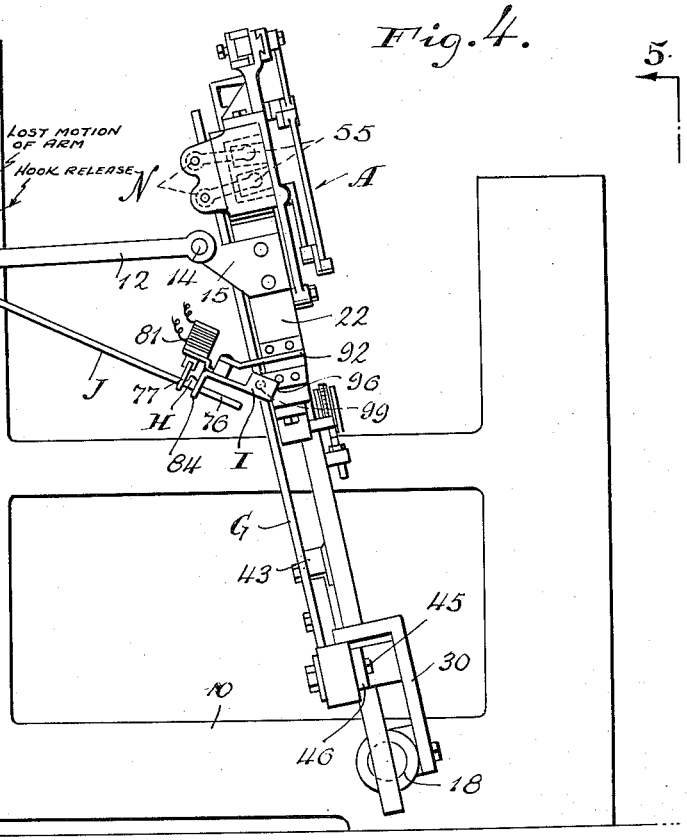
Figure 4 is a side view of the lay end structure at its rearmost position.

Referring to Figures 4 and 5, the loom structure 10 carries the shaft 11 and the shaft 11 in turn carries the crank plate L.

The crank plate connector 12 is pivotally connected to the crank, as indicated at 13. The other end of the crank connector is pivotally connected at 14 to a bracket 15 attached to the lay end structure.

Referring to Figure 5, the lay A is provided with the race 16 carried by the lay swords 17 which swords are supported on the rocker shaft 18. The rocker shaft 18 is pivotally mounted at 19 in the loom frame 10.

The shuttles normally move across the lay A above the race 16 and in front of the reed 21. After the shuttles have passed across the race or shed the reed 21 advances to beat up the filling into the fell position.

Carried on the end of the lay A is a U-frame structure 22 which guides and carries the elevator structure 23. The elevator structure is provided with a series of supporting rods 24, 25 and 26 which respectively move in the support sleeves 27, 28 and 29. The support sleeves 27 to 29 are carried at their lower ends by the frame 30 on the rocker shaft 18.

In the construction shown, two shuttles are carried in each of the shuttle boxes C and 32, which are provided with tongues 33 shown in Figure 7, fitting in grooves 34 in the side plates 35 of the U-frame structure 22.

The shuttles E of the shuttle box B, when exhausted, give an indication at the indicating box B, shown in Figure 1a and set in motion a mechanism, which actuates the elevator 23 through the chain 23a and pulleys 23b, the changing mechanism being more fully shown in said Patent No. 2,017,065.

The box C is first released and then lowered from its operating position (see Figure 5) by the elevator 23, which releases pins 23c (see Figure 11) holding said operating box C. The pins 23c are released by contact between the cam element 36 on the elevator 23 and the lever contact 37.

As the elevator lowers the operating box C, the reserve box 32 in the U-frame 22 will slide downwardly into operating position and be positioned by the pins 23c. As the elevator lowers the exhausted shuttle box C, its cam 36 will next contact the lever 38, which through a link 39 and the L-lever 40, actuates a jaw member 41 to grasp and thereby shift the lowermost reserve box 33 in the magazine frame 42 off the holding members 31 and into the U-frame structure 22.

The operation of this changing mechanism, and transfer of shuttle boxes C from operating position, 32 into operating position and 33 from the magazine frame 42 to the U-shaped lay frame 22 is more fully described in said Patent No. 2,017,065.

The picker stick G (see Figure 5) is provided with a quadrant 43 receiving the strap 44, which strap when suddenly pulled inwardly throws the stick G to the right.

The picker stick G is pivotally mounted at 45 upon the ear 46 extending inwardly from the frame 30.

The return spring 47 tends to throw the picker stick to the left, in the direction indicated by the arrow 48 (see Figure 5).

The upper end of the picker stick is received in the slots 49 in the webs 50 of the pickers N each of which pickers is provided with a bored rear enlargement 51 sliding upon the guide rods 52 and a front enlargement 53 which acts to stop the spurs 54 of the shuttles E (see Figures 7 and 11).

This enlargement 53 normally acquires a depression or recess 55 from which the shuttles must be removed before a change operation may be satisfactorily accomplished and it is to a control to accomplish such release that the present invention is particularly directed.

Figure 6:
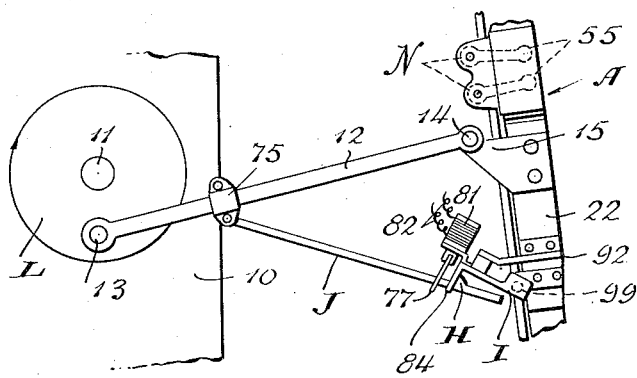
Figure 6 is a fragmentary side view similar to Figure 4 with the lay end in a different position in advance of the position shown in Figure 4.

Referring to Figures 4 to 6, the rod J carrying the latch H is connected to the crank connector 12 by the clamp 75.

The end 76 of the rod J is received in the openings in the ears 77 and 84 (see particularly Figure 8). The ear 77 is pivotally connected at 78 to the clevis 79 at the lower end of the armature 80 of the solenoid 81.

The solenoid 81 is energized through the wires 82 and when energized, it lifts the rod J and this occurs when an indication has been given at the indicating box B (see Figure 1a) that the filling is exhausted in one or both of the shuttles.

The rod J will normally be in lowered position and the latch H will ride through the opening 86 in the ear 84 without engagement.

When the rod J is elevated and is moved rearwardly, preparatory to change, however, the latch or tooth structure H will latch in the recess 83 in the ear 84, thus being retained in position.

The ear 84 is rigid with the lever I. The upper part of the lever I is provided with the offset flange 87, which has an extension 88 carrying the solenoids 81. The lever I is carried by the bearing annulus 89 which is received on the pivot 90 attached to the end member 91 of the bracket 92.

The bracket 92 is provided with the flanges 93 which are bolted or riveted, as indicated at 94 to the U-frame or lay end structure 22. The arm 95 of the lever I is provided with an upstanding flange 96 at its end (see Figures 8 and 9).

In the path of movement of the flange 96 and normally spaced therefrom by the space S to provide lost motion, is the head 98 of the push rod 99. The push rod passes through an opening in the extension 100 from the bracket 92. The extension 100 also serves as a reaction member for the springs 97 and 100a encircling the rod 99 on opposite sides of said plate 100.

The other end of the push rod 99 is provided with a contact member 101 which upon inward movement of the rod 99 presses upon the plate 102 on the side of the picker stick G.

The lever I is also provided with the stop 95a (see Figure 9) contacting with the elements 95b when the lever I is in its normal retracted position.

In operation, in the intervals between changes of shuttles, the solenoid 81 of Figure 8 will be deenergized and the rod J in its lowermost position will ride in the bottom of the eye 86 in the ear or flange 84.

During this operation, the pickers N will be in the solid line position, as indicated in Figure 7, and the shuttles E will be stopped with their spurs 54 engaging the recesses 55 in the pickers N.

When an indication is made at the indicating box B of Figures 1a to 3a to cause a change in shuttles, this indication will cause energization of the solenoid 81, as shown in Figure 8, elevating the armature 80 and the rod J.

This indication will occur during the dwell of the shuttles in the indicating box B and during the arc K indicated in Figure 1. When the rod J moves rearwardly and the junction point 75 moves upwardly along the curve 201, the latch H will engage with the lever I, the tooth H hooking into the recess 83 in the downwardly extending ear or flange 84 of the lever I at crank position $a$ of Figure 4.

Then, the rod J will pull the lever I so as to move it in the direction indicated by the arrow 103 in Figure 9.

After sufficient movement to take up the space S (Figure 9), the flange 96 will contact the rod 99 at position $b$ of Figure 4 and will push the rod 99 inwardly to press the picker stick from the dotted line position to the solid line position shown in Figure 2a. With the picker stick G will move the pickers N, as shown in Figure 7. The pickers N will be moved until position $c$ of Figure 4, to a position inside of their normal position. Then, as they are being withdrawn, the shuttles, as indicated in Figure 4, will strike them at position $d$, and will move with them until position $e$. Thus the shuttles will be stopped. The pickers, in the meanwhile, have picked up speed and will continue to move until position $f$ is reached.

Although the solenoid 51 may be deenergized after the end of the arc K of Figure 1, during the latter part of the arc K and the arc P, the engagement of the latch H with the recess 83 will be maintained as the rod J is being drawn back by the connector 12 against the spring 97 and the junction point 75 moved upwardly as indicated by the arrow 201.

After the shuttles have been stopped in the box C, at the change side of the loom, the rod J will be released at the position $g$ (Figure 4) as the junction point 75 moves downwardly along the arc 200.

When this has occurred, the spring 47 connected to the picker stick G (see Figure 5) will have moved the picker stick back to its normal position, as indicated by the dotted lines in Figure 2a and the pickers N back to their solid line position of Figure 7 with the result that the pickers N will be altogether disengaged from the spurs 54 of the shuttles E.

By this operation, the pickers contact the incoming shuttles as they are moving slowly outwardly and then this returning or reverse movement picks up speed until the pickers have left the shuttle spurs or points free.

It is necessary to select such lever ratios and lost movement between the lever and the push rod actuating the picker stick that there is a quick withdrawal movement of the pickers after the shuttles have been stopped by the withdrawing pickers.

The change of shuttles or of the shuttle box C may now take place without difficulty with assurance that the shuttles will be altogether disengaged from the pickers.

In Figures 12 to 15, is shown one type of indicating mechanism which may be employed in connection with the box B shown in Figures 1a to 3a.

However, it is to be understood that many other types of indicating mechanisms may be employed.

Referring to Figures 12 to 15, in Figure 12, the shuttles E are shown in position in the shuttle box structure B with the spurs 54' of the shuttles fitting into the pickers M. These pickers M receive the upper end of the picker stick F in the slots 49' and they are operated in the same manner as the picker stick G and pickers N.

As shown in Figure 13, each shuttle E is provided with metal plates 124, 125 which contact the noses 126 of the push rods 127 sliding in the sleeves 128. The noses are normally pressed against said plates 124, 125 by the coil springs 129.

The sleeves 128 are supported by the brackets 130 upon the exterior of the shuttle box structure B and electrical connections may be made to them as indicated at 140. The electrical connections may be extended to actuate the solenoid 81 of Figure 8 and also the shuttle changing mechanism of Figure 5 directly or indirectly.

As indicated in Figures 14 and 15, each shuttle E receives a quill or cop 131 carrying the filler 132. The quill or cop 131 is received upon the mount 133 which is pivotally connected at 134 to the shuttle structure.

Received in the slot 135 in the mount 133 is the latch member 136 which is pivotally mounted at 137 and which is normally pressed upwardly by the leaf spring 138. The filling, as indicated at 139, before exhaustion, holds said latch 136 down inside of the slot 135 and inside of the quill 131.

As indicated in Figure 14, the contact plate 124 is connected by the wire 141 to the pivot mount 134, which is in turn electrically connected to the latch 136. The pin 142, on the other hand, extends across the latch 136, and is electrically connected to the other plate 125.

In operation, therefore, when the filler 139 has been exhausted, the latch 136 will be released and will snap up into contact with the pin 142 and establish a circuit between the plates 124 and 125.

When the shuttle or shuttles E are thrown home into the indicating box B, a current will then flow between the leads 140, energizing the solenoid 81 of Figure 8 through the leads 82 and also causing a change operation to take place. In this change operation, the elevator 23 is lowered with the exhausted shuttle box C or if desired, the exhausted shuttles may be ejected or removed from position in the shuttle box C and replaced with fresh shuttles or shuttles containing different types of filler, which it is desired to employ.

It is thus apparent that the present application discloses a picker control method and arrangement which gives assurance that the spurs of the shuttles will be released from the pickers prior to the change operation without the necessity of delaying the change operation to cause such release.

It is also apparent that this is accomplished by utilizing the indicating mechanism customarily associated with the lay structure without the necessity of substantially modifying the structure of the lay or of the loom.

It is apparent that the specific illustrations shown above have been given by way of illustration and not by way of limitation and that the structures above described are subject to wide variation and modification without departing from the scope or intent of the invention all of which variations and modifications are to be included within the scope of the present invention.

What is claimed is:

1. A picker control mechanism for shuttle box change looms, said looms being of the type which have an indicating box to receive the shuttles at one side of the loom, said boxes being provided with electrical feeler mechanisms and with a circuit connected to said feeler mechanisms, which is closed when the weft is almost exhausted and having a changing box at the other side of the loom in which the shuttles are received when thrown from said indicating box across the shed, which changing box is replaced by another changing box having fresh shuttles when the weft is exhausted upon the operating shuttles, which comprises means for moving the pickers on the change side of the loom inside of their normal position to stop the shuttles inside of their normal stopping position, means actuated by closure of said circuit to actuate said last mentioned means, and means for returning the pickers and moving them outwardly from the shuttles after the shuttles have stopped.

2. A picker control mechanism for shuttle box change looms, said looms being of the type which have an indicating box to receive the shuttles at one side of the loom, said boxes being provided with electrical feeler mechanisms and with a circuit connected to said feeler mechanisms, which is closed when the weft is almost exhausted and having a changing box at the other side of the loom in which the shuttles are received when thrown from said indicating box across the shed, which changing box is replaced by another changing box having fresh shuttles when the weft is exhausted upon the operating shuttles, and having pickers and picker sticks which comprises means actuated only upon closure of said circuit for moving the pickers inside of their normal position to stop the shuttles inside of their normal stopping position, an actuator for said first mentioned means operated when said circuit is closed, and means for returning the pickers, said shuttles being stopped by the pickers as the pickers are returning and moving them outwardly from the shuttles after the shuttles have stopped, said first mentioned means including a latch normally disengaged during operation, means to cause engagement of said latch upon indication that the shuttles are to be changed, said latch being disengaged after said shuttles have been stopped at the changing side of the loom.

3. A picker control mechanism for shuttle box change looms, of the type provided with an indicating box at one side of the loom provided with electrical feeler means and with a circuit connected to said electrical feeler means which circuit is closed when the weft upon the shuttles in said connection box is almost exhausted and a changing box at the other side of the loom to which the shuttles are thrown from said indicating box, and which changing box containing the exhausted shuttles is replaced by a box with fresh shuttles when the weft on the operating shuttles is almost exhausted and also provided with a lay structure, shuttles, a lay connector, picker sticks and pickers moved by said picker stick, which comprises a push rod to move the picker stick, a lever mounted upon the lay structure to move said push rod, means to move said lever to move said picker stick, and thereby move the pickers, and means to actuate said last mentioned means only when an indication is given that the shuttles are to be changed, said lever being actuated before said shuttles are received on the changing side of the loom.

4. A picker control mechanism for shuttle box change looms, of the type provided with a box at one side of the loom in which an indication is had when the shuttles are in said box and the weft should be replenished and a box at the other side of the loom to which the shuttles are thrown from said first box and in which the shuttles are to be changed to replenish the weft and also provided with a lay structure, shuttles, a lay connector, picker sticks and pickers moved by said picker stick, which comprises a push rod to move the picker stick, a lever mounted upon the lay structure to move said push rod, means to move said lever to move said picker stick, and thereby move the pickers, and means to actuate said last mentioned means only when an indication is given that the shuttles are to be changed, said last mentioned means including a solenoid, a circuit closer arrangement actuated at the other side of the loom to close the circuit of the solenoid when the shuttles are to be changed, a latching arrangement controlled by said solenoid, a connection from the lay connector to actuate said latch arrangement and a lever arrangement to move the pickers controlled by said latch arrangement, said solenoid being energized before said shuttles are received in the box at the change side of the loom.

5. In combination in a loom, of the type provided with an indicating box at one side of the loom provided with electrical feeler means and with a circuit connected to said electrical feeler means which circuit is closed when the weft upon the shuttles in said connection box is almost exhausted and a changing box at the other side of the loom to which the shuttles are thrown from said indicating box, and which changing box containing the exhausted shuttles is replaced by a box with fresh shuttles when the weft on the operating shuttles is almost exhausted, a crank connecting rod, a picker stick, a picker actuated by said picker stick, a push rod to move said picker stick, a lever to move said push rod, means actuated from the crank connecting rod to move said lever and means to cause engagement or release of said last mentioned means actuated only upon closure of said circuit.

6. In combination in an automatic shuttle box changing loom, of the type provided with an indicating box at one side of the loom provided with electrical feeler means and with a circuit connected to said electrical feeler means which circuit is closed when the weft upon the shuttles in said connection box is almost exhausted and a changing box at the other side of the boom to which the shuttles are thrown from said indicating box, and which changing box containing the exhausted shuttles is replaced by a box with fresh shuttles when the weft on the operating shuttles is almost exhausted, a picker stick, pickers, shuttles stopped by said pickers, means to move said pickers inwardly to stop the shuttles in advance of their usual positions actuated by said circuit, said moving means being actuated before said shuttles are received in said change box and while the shuttles are moving across the loom and means to release said pickers after said shuttles have stopped.

7. In combination in an automatic shuttle box changing loom, of the type provided with a box at one side of the loom in which an indication is had when the shuttles are in said box and the weft should be replenished and a box at the other side of the loom to which the shuttles are thrown from said first box and in which the shuttles are to be changed to replenish the weft, a picker stick, a picker to stop the shuttle and provided with a recess to engage the spur of the shuttle, an indicating arrangement to indicate when the shuttles are to be changed, a solenoid having an armature and energized by said indicator, a push rod carried by the lay to move said picker stick, a lever mounted upon said lay to move said push rod, a latching lever pivotally mounted on the crank connector, said lever being provided with a downwardly extending flange provided with an opening receiving said latching bar, said latching bar normally passing through said opening without engaging the same, and ring means on said armature also provided with an opening receiving said latching bar to elevate said latching bar to cause engagement of the latching bar with said lever and movement of said lever to move said picker stick, when said solenoid is energized.

HENRY DOWNER JOHNSON, Jr.
WOODRUFF T. SULLIVAN.